United States Patent [19]

Clay et al.

[11] 3,887,276

[45] June 3, 1975

[54] RAPIDLY ACCESSIBLE OPTICALLY STORED INFORMATION

[75] Inventors: Burton Ross Clay, Wayland; Douglas Alan Gore, Bedford, both of Mass.

[73] Assignee: The United States of America as represented by the Secretary of the Navy, Washington, D.C.

[22] Filed: Oct. 18, 1972

[21] Appl. No.: 298,706

Related U.S. Application Data

[63] Continuation of Ser. No. 134,383, April 15, 1971, abandoned.

[52] U.S. Cl. .............. 353/26; 340/173 LT; 350/3.5
[51] Int. Cl. .......................................... G02b 27/00
[58] Field of Search.................... 350/3.5; 352/85 H; 353/25–27; 340/173 LT, 173 LM; 250/219 D, 219 DD

[56] References Cited

UNITED STATES PATENTS

| 3,560,072 | 2/1971 | Silverman et al. ................... 350/3.5 |
| 3,572,881 | 3/1971 | Nishida et al. ..................... 350/3.5 |
| 3,610,722 | 10/1971 | Bestenreiner et al. ............... 350/3.5 |
| 3,612,640 | 10/1971 | Kogelnik ............................. 350/3.5 |

Primary Examiner—Ronald J. Stern
Attorney, Agent, or Firm—R. S. Sciascia; Henry Hansen

[57] ABSTRACT

Address information is optically stored in the form of Fraunhofer holograms on successive frames of a film. During search, while any part of the Fraunhofer hologram of a rapidly moving frame is in the readout coherent light beam, the reconstructed image of the address of that frame remains stationary and superimposed over the matrix of light sensing elements employed to read the stored addresses.

1 Claim, 3 Drawing Figures

PATENTED JUN 3 1975
3,887,276
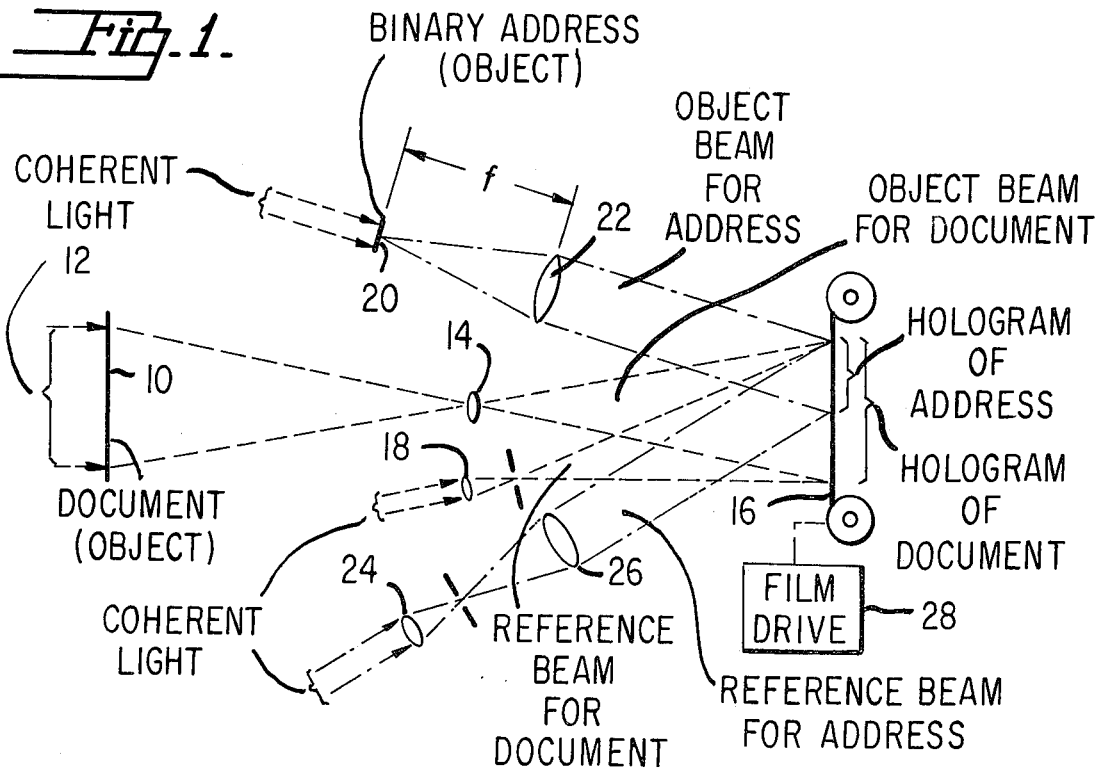
*Fig. 1.*
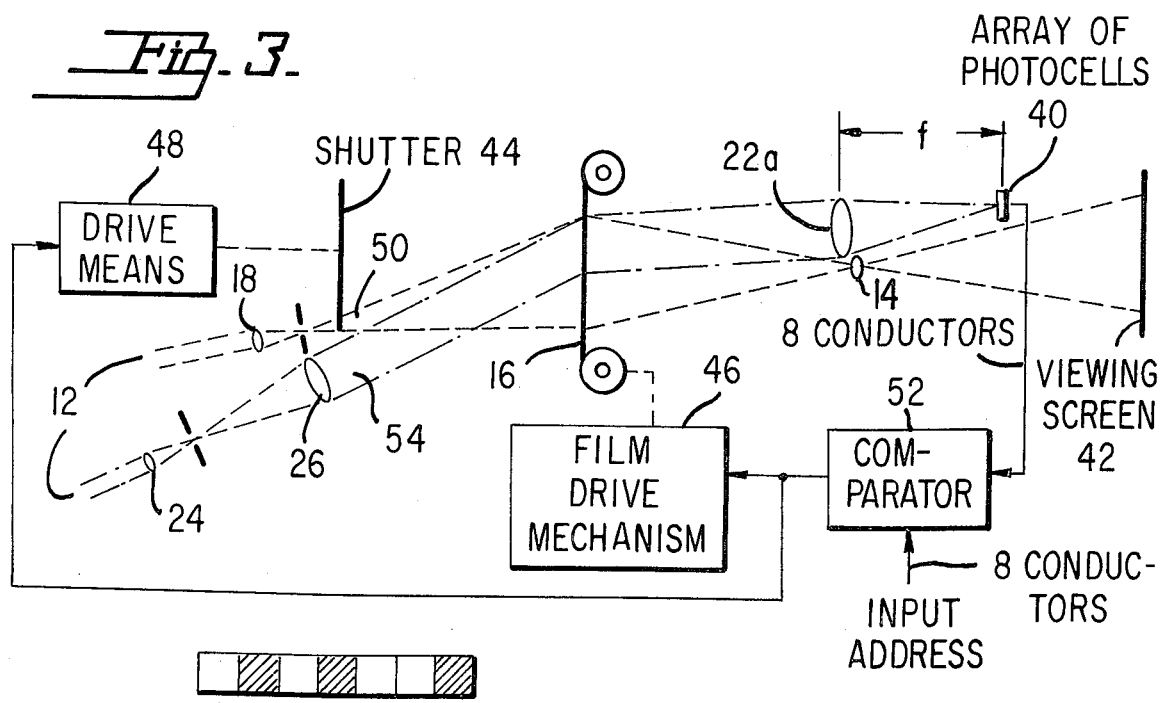
*Fig. 3.*
*Fig. 2.*
1 0 1 0 1 1 0
INVENTORS
BURTON R. CLAY &
DOUGLAS A. GORE
ATTORNEY

RAPIDLY ACCESSIBLE OPTICALLY STORED INFORMATION

STATEMENT

The invention described herein was made in the course of or under a contract or subcontract thereunder with the Department of the Navy.

CROSS-REFERENCES TO RELATED APPLICATIONS

This is a continuation of application Ser. No. 134,383 filed Apr. 15, 1971, now abandoned.

BACKGROUND OF THE INVENTION

Optical information storage and retrieval systems in which each frame on a film includes both data and address information are well known. The data normally occupies a major portion of the frame and the address, consisting of transparent and opaque areas representing, for example, the binary digits (bits) 1 and 0, normally occupies a relatively small region at one edge of a frame or even the space between successive frames.

In order to retrieve a frame of information, the user supplies an address and this address is compared with the addresses appearing on the successive frames as the film is rapidly advanced through the machine. Each address is projected onto a matrix of light detecting elements, such as photocells, and they convert the successive optically stored addresses into electrical signals. When the electrical signals indicative of an address match those of the address called for by the user, the film is stopped and the information appearing on the particular frame then in view is projected onto a viewing screen.

Information storage and retrieval systems of the type discussed above have a number of operating disadvantages. The motion of the recording medium produces a corresponding motion in the address image being projected over the matrix of light detecting elements. The amount of time the address information appears superimposed over the detector matrix depends, of course, on the speed of the film during search and the area of the film occupied by the address. If it is desired to speed up the search, the film must be moved faster and this means that the light detectors and the circuits associated with the light detectors must be made to operate at increased speeds and/or the area on the film at which the address is stored has to be increased. The former means that the cost of these circuits will be higher. The latter means that less frame area is available to store data.

A second problem in the known systems described above is the necessity for insuring that the address information not be obscured or damaged by scratches and/or by dirt particles. If a recorded address is abraded sufficiently by the transport mechanism or picks up a sufficient number of dirt particles, the corresponding frame may be irretrievable or one address may be mistaken for another address.

A third drawback of the known systems discussed above is that there are stringent requirements on the alignment of the address information to insure that the image address will superimpose over the detector matrix in the $x$, $y$ and $z$ directions.

SUMMARY OF THE INVENTION

A film which has recorded thereon at frames thereof Fraunhofer holograms storing address information. During search, the film continuously is driven and a read-out coherent light beam is applied to the moving film in a direction to reconstruct the images stored in the Fraunhofer holograms. A light sensing array is located at the position of the images reconstructed from the Fraunhofer holograms for reading out the addresses.

BRIEF DESCRIPTION OF THE DRAWING

FIG. 1 is a schematic showing of the write portion of a system according to an embodiment of the invention;

FIG. 2 shows a binary address block such as may be employed in the system of FIG. 1; and FIG. 3 is a schematic showing of a system according to an embodiment of the invention during search and read-out.

DETAILED DESCRIPTION

FIG. 1 should be referred to first. The document 10 whose contents it is desired optically to store is illuminated by a coherent light beam 12 such as one produced by a laser. An optical system illustrated schematically at 14 projects the light passing through the document onto a frame of a film 16. This beam is known as the object beam.

The same source of coherent light may be applied via an optical system illustrated schematically at 18 to the same frame of the film 16. This beam is known as a reference beam and, as is well understood in this art, the object and reference beams form an interference pattern known as a hologram which is recorded on the frame of the film 16.

After a hologram of the document is recorded, coherent light is passed through a film 20 which stores a binary address. As shown in FIG. 2, the address on film 20, may be in the form of transparent and opaque areas which represent the bits 1 and 0. The address bits may be located as shown or may be arranged in a two dimensional array, such as a square or rectangular array. The light passing through the film 20 is projected by a lens 22 onto a portion of the same frame already discussed. The lens 22 is spaced from the object film 20 a distance f equal to the focal distance of the lens so that the object beam of light produced by the lens consists of essentially parallel rays. Coherent light from the same source is projected via the lens system 24, 26 over the same region of the frame to provide a parallel ray reference beam. Again, the object and reference beams create a light interference pattern at the film 16 which is recorded there in the form of a hologram of the address.

The hologram of the address may be superimposed over the hologram of the data and may occupy up to 50% or more of the frame area. As the object and reference beams for the address reach the film at different angles than the object and reference beams for the document, these two holograms, even though superimposed, do not interfere with one another during read-out. As an alternative, the document and address holograms may be made with coherent light of two different wavelengths and in this case both holograms may be formed on the film concurrently.

With the placement of the object 20 (the address film) at the focal plane of the lens 22, the hologram which is formed at the film is one known in the art as a Fraunhofer type hologram. Because the light produced by the lens consists of essentially parallel rays, it makes it appear that the effective object distance is infinite, and when an object is at infinity, considerable movement of the object is not easily observable and does not affect the hologram which is formed. Conversely, and this is the important point in the use being made of this property in the present application, during read-out of the hologram made in this way, movement of the hologram relative to the read-out beam does not result in movement of the reconstructed image. The complete image remains in fixed position so long as any part of the address hologram is in the read-out beam.

After the holographic recordings discussed above have been made, that is, after the frame in position has been exposed, both to the document and address "objects," the film drive mechanism 28 moves a new frame of the film into place and another document and address are moved into position at 10 and 20 respectively. Holograms are made in the same manner of these objects and the process is continued until all of the documents and addresses have been stored. Thereafter, the film 16 is developed and fixed.

The system shown in FIG. 3 may be employed for reading out the holographically stored information. The lens system 24, 26 is the same as that shown in FIG. 1 and is in the same position relative to the film 16. The lens system illustrated at 18 also is the same as the like numbered system of FIG. 1 and is in the same position relative to film 16. The coherent read-out beams 12 may be produced by the same laser as employed in the FIG. 1 arrangement.

The system of FIG. 3 also includes an array of photocells 40 located at a position relative to the film 16 which is conjugate to that of the binary address object 20 in FIG. 1. A lens 22a at its focal distance f from the photocells 40 focuses the image of the address onto the photocells. The viewing screen 42 is located at a position relative to the film 16 which is conjugate to that of the document 10 in FIG. 1. Accordingly, when a frame is in position and both read-out beams are on, and the shutter 44 is open, the image of the address of the frame being viewed appears superimposed over the array of photocells 40 and the image of the information stored in the frame appears at the viewing screen.

During a search operation, the film drive mechanism 46 drives the film continuously and rapidly (not in intermittent fashion). The drive means 48 maintains the shutter 44 blocking the read out beam 50 for the stored document information. The comparator 52 compares the input address, which in this example consists of an eight bit word, with the eight bits supplied by the array of photocells 40. In practice, during the entire time that any portion of the address hologram stored on a frame is in the address read-out beam 54, the reconstructed image of the address remains stationary and superimposed over the array of photocells. Since the address hologram may occupy a relatively large part of the frame area, as much as 50% or more, this means that the address image reconstructed from the hologram remains stationary for a relatively long time interval, even though the film is moving rapidly. This rapid and continuous movement of the film 16 by the film drive mechanism 46, does not cause the reconstructed image to move, in view of the image mobilization properties of Fraunhofer holograms, as mentioned above. Moreover, neither vibration of the film nor movement of the film toward or away from the lens 26 affects the image immobilization properties of the Fraunhofer hologram. Accordingly, it is possible greatly to speed up the search process. Moreover, as is well understood in this art, holograms are not seriously affected by scratches or dirt so that the address information cannot easily be obscured, distorted or destroyed.

When the comparator 52 indicates that the frame called for by the input address is in viewing position, it applies a signal to the film drive mechanism 46 for stopping the film. Concurrently, it applies a signal to the drive means 48 for causing the latter to open the shutter. The drive means 48, as one example, simply may be a relay for moving the shutter out of the read-out beam 50. Alternatively, the shutter may consist of a disk with an aperture therein and the drive means 48 a small motor for rotating the disk to a position such that the read out beam 50 passes through the aperture. Thus, while during the search operation the viewing screen remains dark so as not to disturb the viewer, when the frame called for is found, the shutter opens and the reconstructed image of the document stored in the frame appears on the viewing screen. The array of photocells 40 normally is blocked from view and is not observed by the viewer.

While in the form of the invention illustrated, the address information is recorded on the film by the use of an object in the reference beam, in some applications a substantially less expensive method may be used. A master tape made of a metal or the like may be employed to impress into the successive frames of a film a contour type Fraunhofer hologram on a mass production basis. Thus, each film as it comes from the factory may already have permanently recorded thereon Fraunhofer holograms containing addresses at each frame. The data holograms may be variable density holograms as already discussed.

It is also to be understood that the film 16 may be, for example, photographic film or plastic film. In the latter case, the data may be stored in the form of contour holograms rather than variable density holograms and similarly, as mentioned above, the address information also may be stored as contour Fraunhofer holograms. In both cases, the holograms may be pressed into the tape using techniques similar to those used for making phono records.

What is claimed is:

1. An optical information retrieval system comprising: a film having a series of frames which has recorded at each frame thereof a first hologram of an information object,
   and a second hologram of the Fraunhofer form over a majority of the area of said frame of a binary encoded index object said first hologram being recorded with a first reference beam and said second hologram being recorded with a second reference beam, said first and second reference beams each having a unique and different angle of incidence upon said film;

means for continuously driving said film;

means for applying first and second coherent light beams to the moving film at incident angles substantially identical to the incident angles of said first and second reference beams respectively, so as to reconstruct an image of said information objects and of said binary encoded index objects;

a viewing screen and means for projecting said image of said information objects upon the viewing screen;

an array of light sensing elements disposed at the position of said image of said binary encoded index objects for detecting the binary code of said index objects during movement of said film and for producing a binary output signal indicative thereof, the image of each said index object from a particular frame remaining stationary and superimposed over said array of light sensing elements during the entire time that any portion thereof is in the second coherent light beam; and comparator means adapted to receive a binary address signal associated with a frame of recorded information object and connected to receive the array binary output signal, said comparator means having an output signal connected to said film driving means for stopping said film when the received signals correspond.

* * * * *